United States Patent
Maguire et al.

(10) Patent No.: US 10,910,613 B2
(45) Date of Patent: Feb. 2, 2021

(54) BATTERY CELL RETENTION ASSEMBLY AND METHOD

(71) Applicant: FORD GLOBAL TECHNOLOGIES, LLC, Dearborn, MI (US)

(72) Inventors: Patrick Daniel Maguire, Ann Arbor, MI (US); Brian Utley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1351 days.

(21) Appl. No.: 14/738,177

(22) Filed: Jun. 12, 2015

(65) Prior Publication Data
US 2016/0365551 A1 Dec. 15, 2016

(51) Int. Cl.
| | |
|---|---|
| H01M 2/10 | (2006.01) |
| H01M 10/62 | (2014.01) |
| H01M 10/64 | (2014.01) |
| H01M 10/65 | (2014.01) |
| H01M 10/647 | (2014.01) |
| H01M 10/6554 | (2014.01) |
| H01M 10/625 | (2014.01) |
| H01M 10/6556 | (2014.01) |

(52) U.S. Cl.
CPC ....... *H01M 2/1072* (2013.01); *H01M 2/1077* (2013.01); *H01M 10/625* (2015.04); *H01M 10/647* (2015.04); *H01M 10/6554* (2015.04); *H01M 10/6556* (2015.04); *H01M 2220/20* (2013.01)

(58) Field of Classification Search
CPC .................................................... H01M 65/67
See application file for complete search history.

(56) References Cited

U.S. PATENT DOCUMENTS

| | | | |
|---|---|---|---|
| 1,734,645 A | 11/1929 | Polland | |
| 2,257,155 A | 9/1941 | Bowers | |
| 4,936,409 A | 6/1990 | Nix et al. | |
| 5,004,081 A * | 4/1991 | Custer | B60R 16/04 180/68.5 |
| 5,308,717 A * | 5/1994 | Gordin | H01M 2/105 24/71 TD |
| 5,806,618 A * | 9/1998 | Luode | H01M 2/1083 180/68.5 |
| 6,512,347 B1 * | 1/2003 | Hellmann | H01M 10/625 320/107 |
| 2003/0165734 A1 * | 9/2003 | Hinton | H01M 6/46 429/120 |
| 2010/0028764 A1 * | 2/2010 | Maier | H01M 10/6567 429/120 |
| 2012/0025045 A1 * | 2/2012 | Meier | H01M 2/1083 248/229.1 |

(Continued)

FOREIGN PATENT DOCUMENTS

| | | | | |
|---|---|---|---|---|
| DE | 102010055599 | | 6/2012 | |
| DE | 102013205063 | * | 9/2014 | ............. H01M 2/10 |

(Continued)

*Primary Examiner* — Barbara L Gilliam
*Assistant Examiner* — Angela J Martin
(74) *Attorney, Agent, or Firm* — David Kelley, Esq.; Carlson, Gaskey & Olds, P.C.

(57) ABSTRACT

An exemplary retention assembly includes a plurality of battery cells, a heat exchange structure, and a strap that pulls together the heat exchange structure and the plurality of battery cells.

19 Claims, 5 Drawing Sheets

(56) References Cited

U.S. PATENT DOCUMENTS

| | | | | |
|---|---|---|---|---|
| 2013/0146249 A1* | 6/2013 | Katayama | ................ | F28F 9/00 |
| | | | | 165/46 |
| 2015/0219706 A1* | 8/2015 | Loftus | .................. | B60L 3/0069 |
| | | | | 324/503 |
| 2015/0287968 A1* | 10/2015 | Maguire | ................ | H01M 2/18 |
| | | | | 429/148 |
| 2016/0036018 A1* | 2/2016 | Gunna | ................ | H01M 10/625 |
| | | | | 429/100 |
| 2016/0133896 A1* | 5/2016 | Baek | .................. | H01M 2/1077 |
| | | | | 429/72 |

FOREIGN PATENT DOCUMENTS

| | | | | |
|---|---|---|---|---|
| EP | 2528136 | | 11/2012 | |
| EP | 2528136 A1 | * | 11/2012 | .............. H01M 2/10 |

\* cited by examiner

BATTERY CELL RETENTION ASSEMBLY AND METHOD

TECHNICAL FIELD

This disclosure relates to battery array retention and, more particularly, to retaining traction battery cells and other components with a strap.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Batteries that provide power to the electric machines can be referred to as traction batteries. The traction batteries include one or more battery arrays secured within a battery pack. The traction batteries can be selectively heated or selectively cooled.

SUMMARY

A retention assembly according to an exemplary aspect of the present disclosure includes, among other things, a plurality of battery cells, a heat exchange structure, and a strap that pulls together the heat exchange structure and the plurality of battery cells.

In a further non-limiting embodiment of the foregoing assembly, the strap extends from a first position adjacent a first lateral side of the plurality of battery cells, to a second position adjacent a second lateral side of the plurality of battery cells.

In a further non-limiting embodiment of any of the foregoing assemblies, the assembly includes an anchor to hold the strap.

In a further non-limiting embodiment of any of the foregoing assemblies, the heat exchange structure comprises the anchor.

In a further non-limiting embodiment of any of the foregoing assemblies, the anchor is a fixed anchor such that the strap is directly secured.

In a further non-limiting embodiment of any of the foregoing assemblies, the first plurality of battery cells interface with a first surface of the heat exchange structure and the strap extends past the first surface to the anchor.

In a further non-limiting embodiment of any of the foregoing assemblies, the plurality of battery cells is a first plurality of battery cells along a first axis, and includes a second plurality of battery cells along a second axis, wherein the strap includes a first portion pulling together the first plurality of battery cells and the heat exchange structure, and a second portion pulling together the second plurality of battery cells and the heat exchange structure.

In a further non-limiting embodiment of any of the foregoing assemblies, the anchor is positioned between the first plurality of battery cells and the second plurality of battery cells.

In a further non-limiting embodiment of any of the foregoing assemblies, the plurality of battery cells form a portion of a traction battery of an electrified vehicle.

In a further non-limiting embodiment of any of the foregoing assemblies, the assembly includes a first sidewall adjacent a first side of the plurality of battery cells, and a second sidewall adjacent a second side of the battery cells. The first side is opposite the second side. The strap directly contacts the sidewalls.

In a further non-limiting embodiment of any of the foregoing assemblies, the strap is spaced from the plurality of battery cells such that no portion of the strap contacts the plurality of battery cells.

In a further non-limiting embodiment of any of the foregoing assemblies, the assembly includes at least one brace. The strap compresses the brace against a side of the heat exchange structure opposite the plurality of battery cells.

In a further non-limiting embodiment of any of the foregoing assemblies, the assembly includes a tensioning device. The strap has a tension and the tensioning device is configured to adjust the tension.

In a further non-limiting embodiment of any of the foregoing assemblies, the heat exchange structure provides a liquid-coolant path.

A retention method according to an exemplary aspect of the present disclosure includes, among other things, pulling together a plurality of battery cells and a heat exchange structure using a strap.

In a further non-limiting embodiment of the foregoing method, the method includes circumferentially surrounding the plurality of battery cells and the heat exchange structure with the strap during the pulling.

In a further non-limiting embodiment of any of the foregoing methods, the method includes tensioning the strap during the pulling.

In a further non-limiting embodiment of any of the foregoing methods, the method includes anchoring the strap at an anchor without fastening the strap to the anchor.

In a further non-limiting embodiment of any of the foregoing methods, the method includes spacing all portions of the strap from the heat exchange structure during the pulling.

In a further non-limiting embodiment of any of the foregoing methods, the plurality of battery cells is a first plurality of battery cells, and the strap further pulls a second plurality of battery cells that are separate and spaced from the first plurality of battery cells.

DESCRIPTION OF THE DRAWINGS

The various features and advantages of the disclosed examples will become apparent to those skilled in the art from the detailed description. The drawings that accompany the detailed description can be briefly described as follows.

DETAILED DESCRIPTION

This disclosure relates generally to retaining components of a battery array. More particularly, this disclosure relates to retaining the components such that the battery cells of the array and a heat exchange structure are pulled together using a strap.

Figure 1:
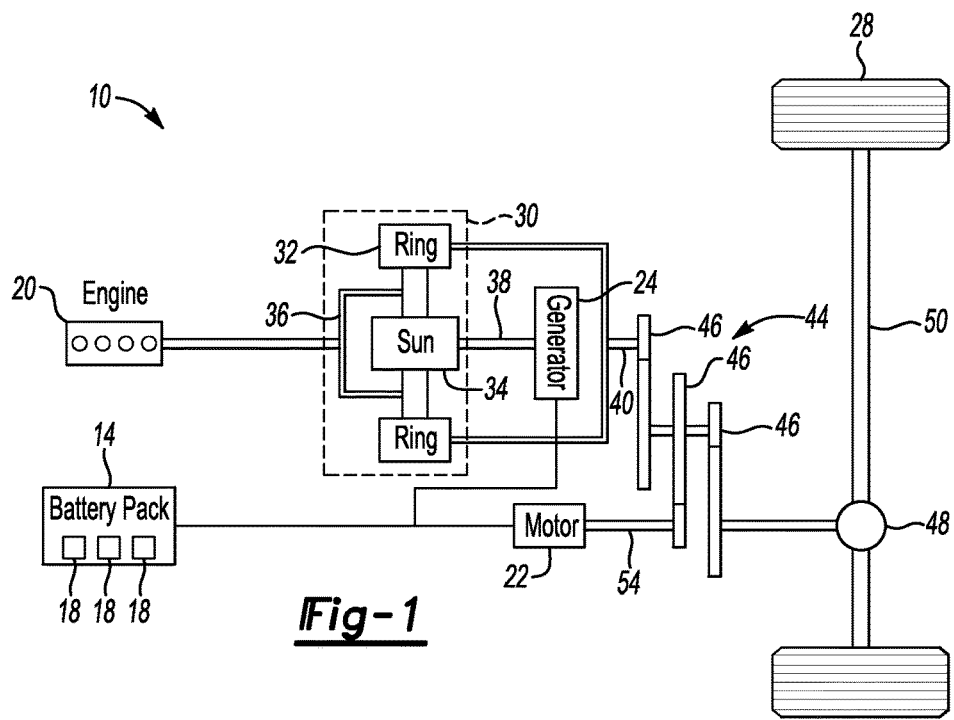
FIG. 1 illustrates a schematic view of a powertrain for an electrified vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The battery pack 14 is a traction battery as the battery pack 14 provides propulsive power that is used to drive the wheels 28.

Figure 2:
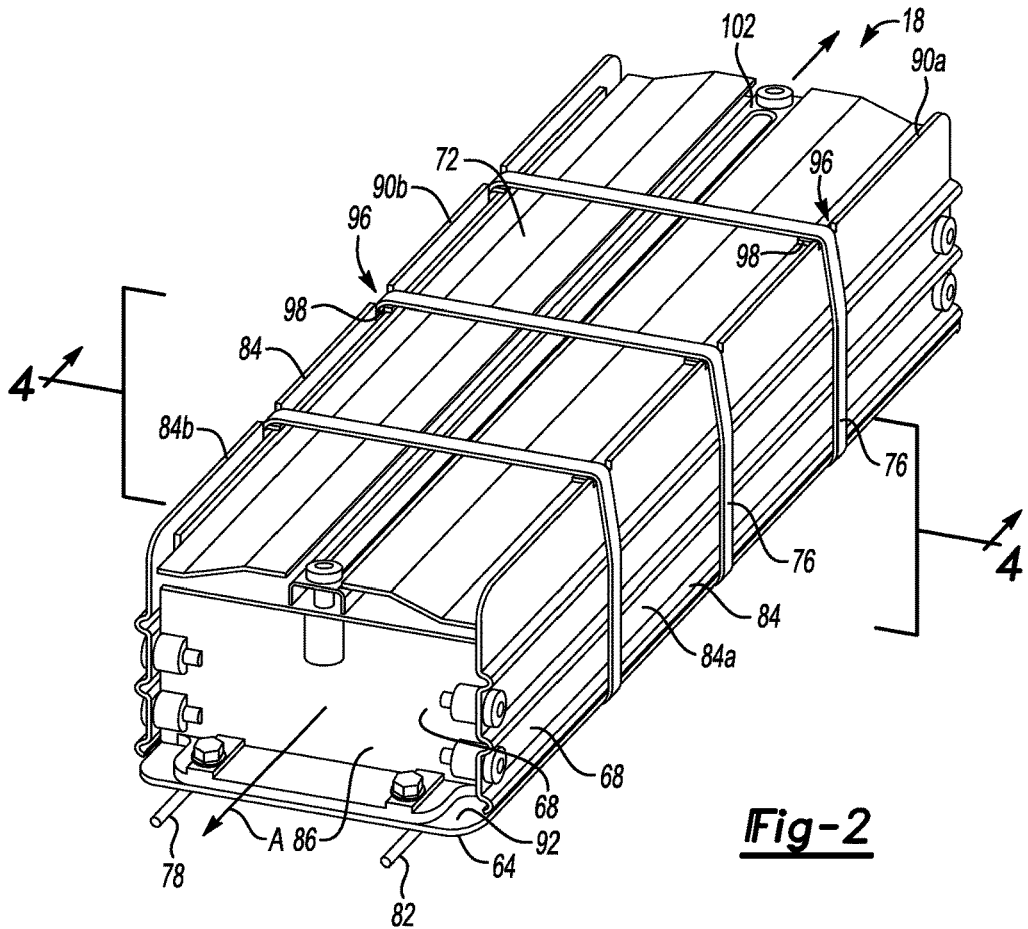
FIG. 2 illustrates a perspective view of a battery array from the battery pack of the powertrain of FIG. 1.
Figure 3:
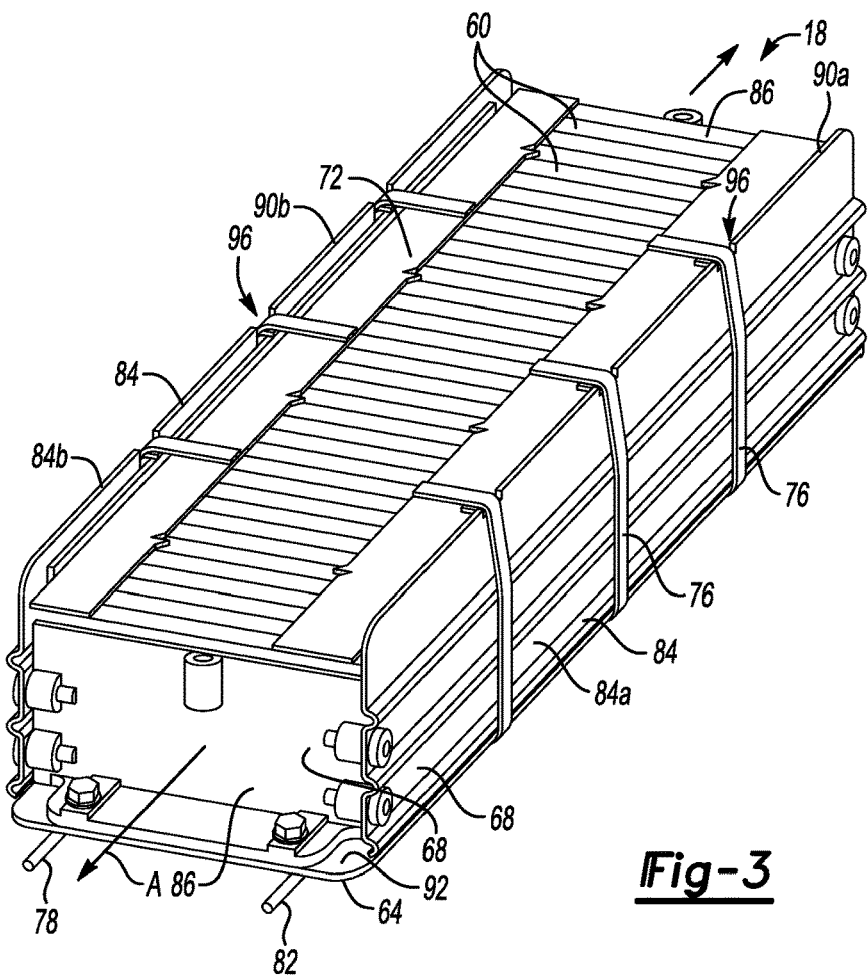
FIG. 3 illustrates a perspective view of the battery array of FIG. 2 with selected portions removed.
Figure 4:
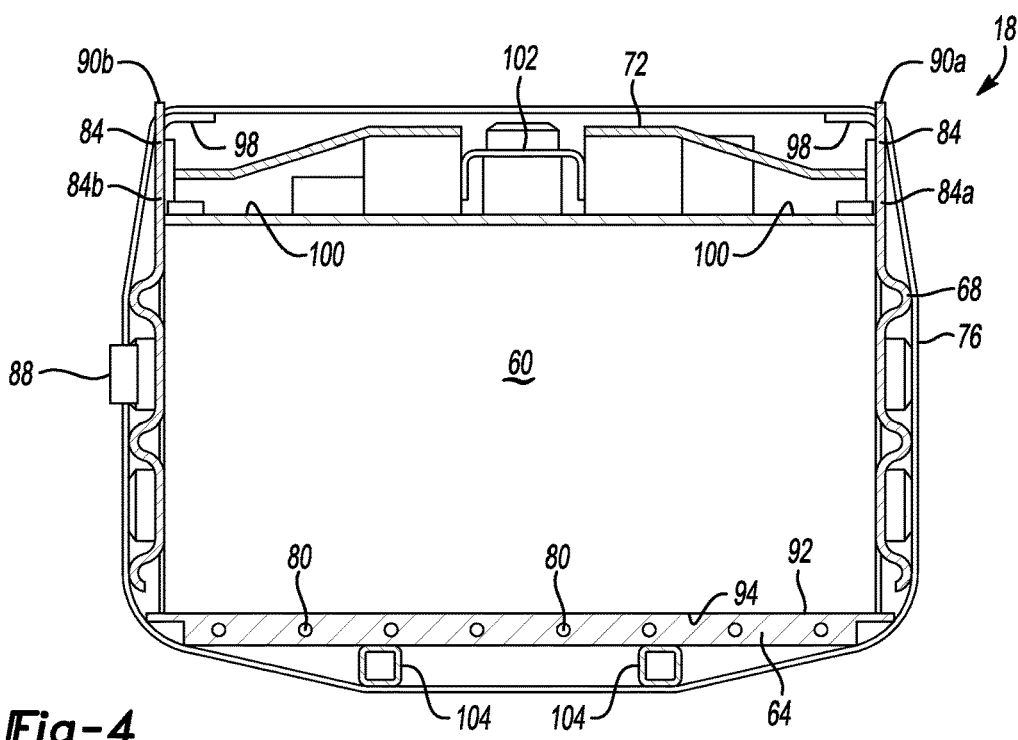
FIG. 4 illustrates a section view at line 4-4 in FIG. 2.

Referring now to FIGS. 2 to 4, each array 18 includes a plurality of battery cells 60, a heat exchange structure 64, array plates 68, a bus bar assembly 72, and at least one strap 76.

The battery cells 60 are disposed on the heat exchange structure 64, which is a heat exchanger plate in this example. The plurality of battery cells 60 are disposed along an axis A. The battery cells 60 are prismatic or pouch cells. Other battery cell types, such as cylindrical cells, could be used in other examples.

The example array 18 is cooled via liquid coolant that is communicated through the heat exchange structure 64. The example heat exchange structure 64 can be considered a cold plate.

In this example, liquid coolant moves through an inlet 78 that opens to a path 80 provided within the heat exchange structure 64. The liquid coolant moves through the path 80 to exchange thermal energy with the cells 60, the array plates 68, and other portions of the array 18. The liquid coolant exits the coolant path at an outlet 82 that opens to the path 80 within the heat exchange structure 64.

Although liquid coolant is used to cool the array 18 in this example. Another example can include heating the array 18 with a liquid that is moved along through the path 80.

The array plates 68 are positioned against or adjacent the sides and ends of the plurality of battery cells 60. The array plates 68 include sidewalls 84 and end walls 86. The sidewalls 84 are disposed on opposing lateral sides of the cells 60. That is, one of the sidewalls 84a is positioned adjacent a first lateral side of the cells 60, and another one of the sidewalls 84b is positioned adjacent an opposing, second side of the cells 60.

The cells 60 are positioned axially between the end walls 86. The cells 60 can be compressed axially between the end walls 86.

In this example, the straps 76 extend circumferentially about the cells 60, the sidewalls 84a and 84b, the bus bar assembly 72, and the heat exchange structure 64. Because the straps 76 completely circumferentially surround the battery cells 60, the straps 76 each extend from a first lateral side of the battery cells 60 to a second lateral side of the battery cells.

The straps 76 are under tension. The straps 76 can each comprise a tensioning device 88 to enable a user to adjust the tension. A person having skill in this art and the benefit of this disclosure could select a tensioning device suitable for tensioning a strap.

The straps 76 have a rectangular cross-section in this example. The strap 76 could be a metal band, a textile, such as a seat belt webbing, a reinforced polymer with glass or carbon fiber tape/fabric, or another relatively high strength, relatively flexible member. Other example straps 76 could have a circular cross-section, such as a rope. The strap 76 could further include multiple individual straps.

Tensioning the straps 76 pulls together the heat exchange structure 64 and the plurality of battery cells 60. Specifically, the example straps 76, when tensioned, pull a surface 92 of the heat exchange structure 64 upwards against a downwardly facing surface 94 of the cells 60.

Pulling together the heat exchange structure 64 and the plurality of battery cells 60 facilitates a robust thermal connection between the heat exchange structure 64 and the cells 60.

The heat exchange structure 64 does not need to directly contact the downwardly facing surface 94. A sheet of thermally conductive material, for example, can be positioned between the downwardly facing surface 94 of the cells 60 and the upwardly facing surface 92 of the heat exchange structure 64.

The example heat exchange structure 64 is disposed at a vertical bottom of the array 18. In other examples, a heat exchange structure could be positioned in another area, such as at a vertical top of the array 18, or at a lateral side of the array 18.

The heat exchange structure 64 is shown as a single plate, but could include multiple individual plates or structures. For example, a first heat exchange structure could be positioned at the vertical top of the array 18, and a second heat exchange structure could be positioned at one of the lateral sides of the array 18.

The example straps 76 directly contact an upwardly facing surface 90a of the sidewall 84a and an upwardly facing surface 90b of the sidewall 84b.

The sidewalls 84 can, in some examples, include slots 96. Each slot 96 is associated with one of the straps 76. The slots 96 of the sidewall 84a are axially aligned with corresponding slots 96 of the sidewall 84b. The slots 96 receive a strap 76 and help to hold the axial position of the strap 76 relative to the remaining portions of the array 18.

The sidewalls 84 include flanges 98 extending toward the axis A from a vertical bottom of the slots 96. The flanges 98 can support the straps 76 and distribute loads due to a tension of the strap 76.

A portion of the strap 76 spans from the sidewall 84a to the sidewall 84b. This portion of the strap 76 is spaced from the bus bar assembly 72.

In another example, this portion of the strap 76 can contact the bus bar assembly 72 to pull the bus bar assembly 72 toward an upwardly facing surface 100 of the cells 60. The straps 76 could, for example, contact a beam 102 of the bus bar assembly 72 to pull the bus bar assembly 72 downwardly against the upwardly facing surface 100 of the cell 60. The beam 102 can be additionally secured at opposing axial ends to the end walls 86.

In this example, braces 104 are positioned between the strap 76 and the heat exchange structure 64. The braces 104 can facilitate distributing a load resulting from tension on the straps 76 into a desired direction and area of the cells 60. The braces 104 could be integrated into the heat exchange structure 64, or could be separate and distinct components from the heat exchange structure 64.

A flat, pliable heat exchange structure having a relatively low stiffness can benefit from the inclusion of braces 104 in some examples. If braces were not used with such the heat exchange structure, the heat exchange structure could encounter a high bending load at its lateral sides, which could cause bending that disrupts the contact between the cells and the heat exchange structure.

Braces 104 can be positioned between the strap 76 and another component of the array 18, such as the sidewalls 84 or the bus bar assembly 72.

Figure 5:
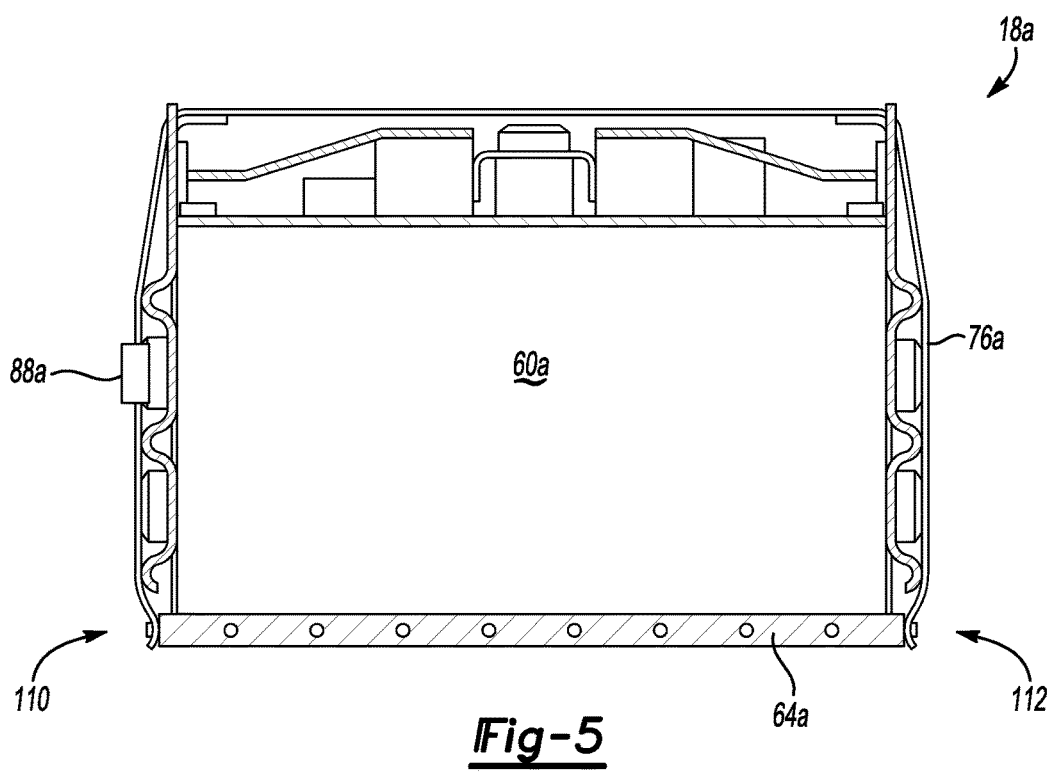
FIG. 5 illustrates a section view of another example battery array for use in the battery pack of FIG. 2.

Referring now to FIG. 5, another example strap 76a pulls together a heat exchange structure 64a and a plurality of battery cells 60a of an array 18a. A fixed anchor 110 holds a first portion of the strap 76a. Another fixed anchor 112 holds a second portion of the strap 76a. In contrast to the strap 76 of FIGS. 2 to 4, the strap 76a does not extend circumferentially about the array 18a.

The fixed anchor 110 is on a first lateral side of the battery cells 60a, and the fixed anchor 112 is on a second lateral side of the battery cells 60a. The strap 76 thus extends from a first lateral side of the battery cells 60a to a second lateral side of the battery cell 60a.

An attachment of the strap 76a to the heat exchange structure 64a provides the fixed anchor 110. An attachment of the strap 76a to the heat exchange structure 64a provides the fixed anchor 112.

A tensioning device 88a can be used to tension the strap 76a. Tensioning the strap 76a exerts forces on the array 18a that pull together the heat exchange structure 64a and the battery cells 60a.

Various techniques could be used to attach the strap 76a to the heat exchange structure 64a including, but not limited to, bolts, clips, tying the strap 76a, adhesives, etc.

Figure 6:
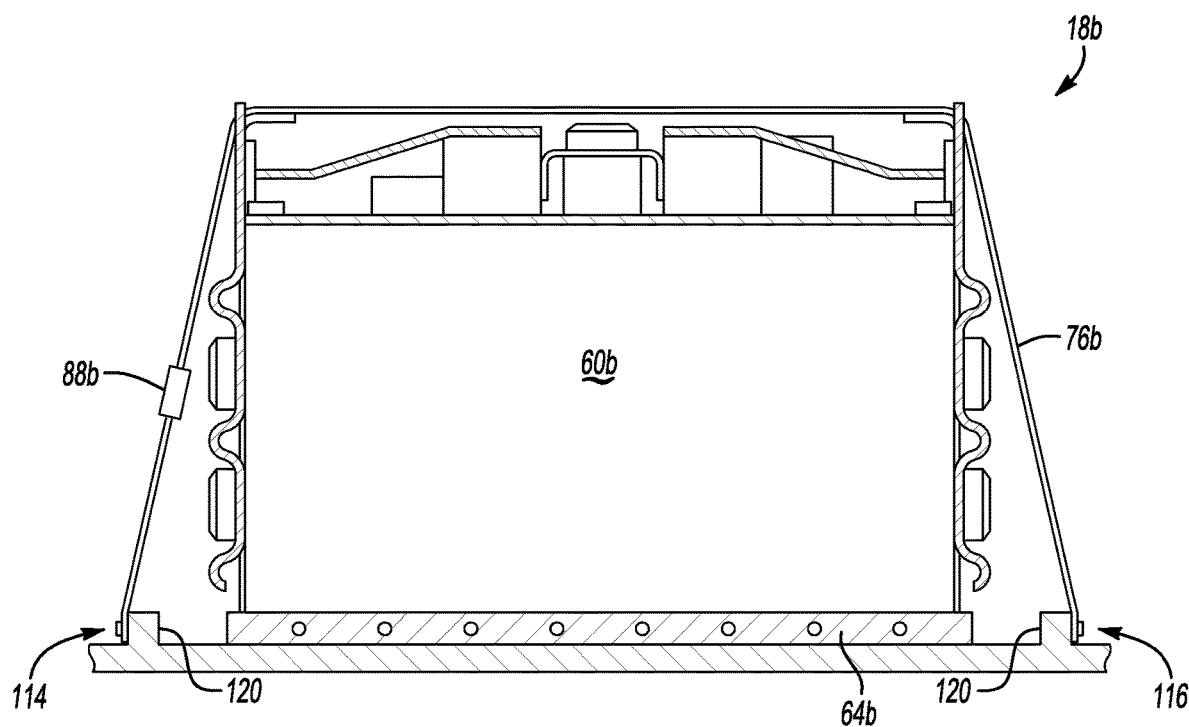
FIG. 6 illustrates a section view of another example battery array for use in the battery pack of FIG. 2.

Referring now to FIG. 6, another example strap 76b pulls together a heat exchange structure 64b and a plurality of battery cells 60b of an array 18b. A fixed anchor 114 holds a first portion of the strap 76b. Another fixed anchor 116 holds a second portion of the strap 76b. Like the strap 76a of FIG. 5, the strap 76b does not extend circumferentially about the array 18a.

The fixed anchor 114 is on a first lateral side of the battery cells 60b, and the fixed anchor 116 is on a second lateral side of the battery cells 60b. The strap 76b thus extends from a first lateral side of the battery cells 60b to a second lateral side of the battery cell 60b.

An attachment of the strap 76a to a tray structure 120 provides the fixed anchor 114. Another attachment of the strap 76a to the tray structure 120 provides the fixed anchor 116.

A tensioning device 88b can be used to tension the strap 76b. Tensioning the strap 76b exerts forces on the array 18b that pull together the heat exchange structure 64b and the battery cells 60b. The example heat exchanger 64b contacts the tray structure 120. The heat exchanger 64b and the tray structure 120 together provide the necessary upward reaction force when the strap 76b is tensioned. That is, both the heat exchanger 64b and the tray structure work in consort to resist any bending moment induced by tensioning the strap 76b or straps. In other examples, other components could provide the reaction force when the strap is tensioned.

The tray structure 120 is separate from the array 18b. The tray structure 120 can be integrated into the battery pack 14 and used to support the arrays 18b.

In another example, the fixed anchor 114, the fixed anchor 116, or both could be secured to something other than the tray structure 114, such as another component of the array 18b.

Various techniques could be used to attach the strap 76b to the tray structure 120 including, but not limited to, bolts, clips, tying the strap 76b, adhesives, etc.

Figure 7:
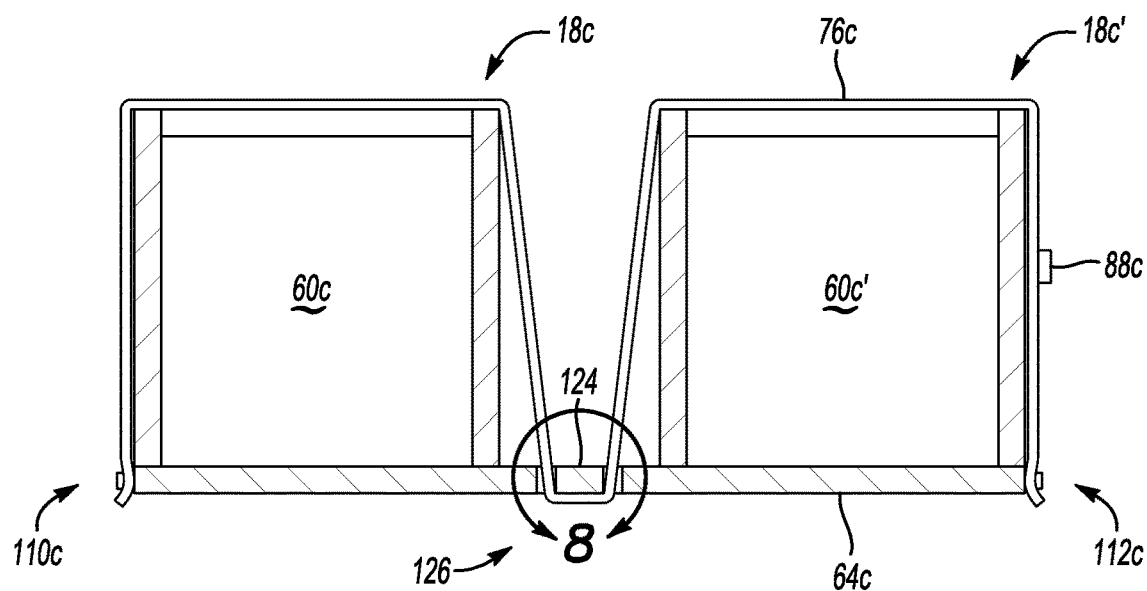
FIG. 7 illustrates a section view of other example battery arrays for use in the battery pack of FIG. 2.
Figure 8:
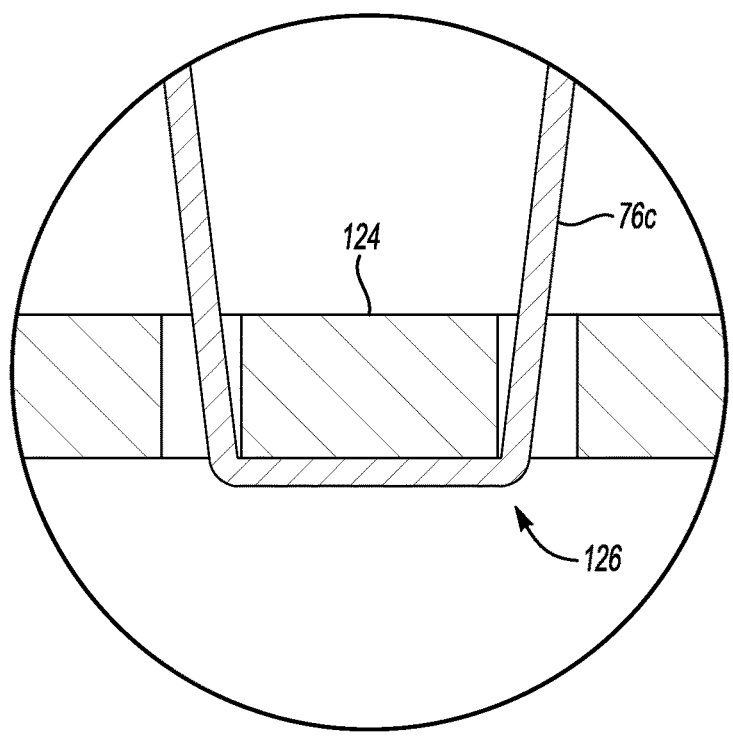
FIG. 8 illustrates a close-up view of a portion of FIG. 7.

Referring to FIGS. 7 and 8, in another example, a strap 76c is used to secure a first array 18c and a second array 18c'. The strap 76c pulls together both a first plurality of the battery cells 60c and a second plurality of the battery cells 60c' with the heat exchange structure 64c.

The strap 76c can include portions secured using the fixed anchor 110c and the fixed anchor 112c. In this example, the heat exchange structure 64c provides both fixed anchors 110c and 112c.

A bar 124 provides an unfixed anchor 126 for a strap 76c. The strap 76c is looped about the bar 124. The example bar 124 is positioned between the array 18c and the array 18c'.

The example bar 124 is part of the heat exchange structure 64c. The strap 76c extends through apertures in the heat exchange structure 64c, which permit the strap 76c to loop about the bar 124. In another example, the bar 124 is separate from the heat exchange structure 64c.

A tensioning device 88c can be used to tension the strap 76c. Tensioning the strap 76c pulls the strap 76c against the bar 124 to provide the unfixed anchor 126. The unfixed anchor 126 is unfixed because the strap 76c is not directly connected to the bar 124.

Because the strap 76c is not fixed to the unfixed anchor 126, tensioning the strap 76c can pull both the battery cells 60c, 60c' together toward the heat exchange structure 64c.

In another example, the anchor 126 is a fixed anchor and the strap 76c includes a second tensioning device. The tensioning device 88c can be used to pull together the battery cells 60c' and the heat exchange structure 64c. The second tensioning device can be used to pull together the battery cells 60c and the heat exchange structure 64c, such that the array 18c can be tensioned separately from the array 18c'.

Figure 9:
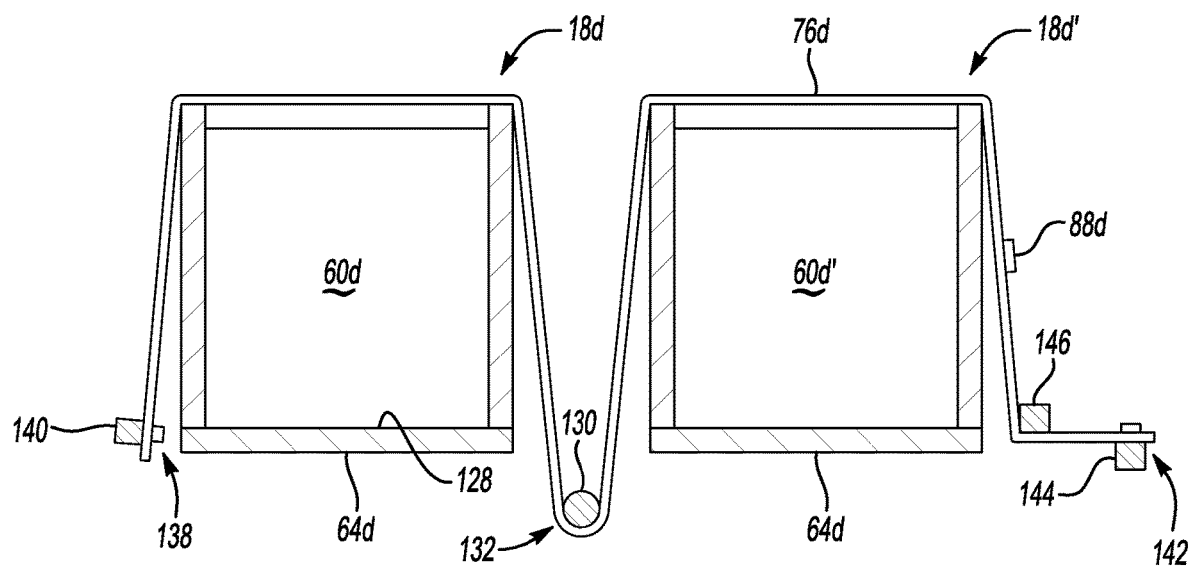
FIG. 9 shows a section view of still other example battery arrays for use in the battery pack of FIG. 2.

Referring to FIG. 9, in another example, a bar 130 provides an unfixed anchor 134 for the strap 76d. The strap 76c is looped about the bar 130.

A tensioning device 88d can be used to tension the strap 76d. Tensioning the strap 76d pulls the strap 76d against the bar 130 to provide the unfixed anchor 132. The unfixed anchor 132 is unfixed because the strap 76d is not directly connected to the bar 130.

In this example, the heat exchange structure 64d includes a first portion associated with the array 18d and a second portion associated with the array 18d'. The first portion and the second portion can be two or more separate and distinct heat exchangers, or could be a portions of a single continuous heat exchanger. The bar 130 is not part of either portion of the heat exchange structure 64d.

The strap 76d extends through an opening between the first and second portions of the heat exchange structure 64d to loop about the bar 130. The bar 130 can be located on a side of the heat exchange structure 64d opposite from the cells 64d or can be located on the tray structure. The bar 130 can be fully or partially below the heat exchanger structure 64d.

In this example, the battery cells 60d interface with the heat exchange structure 64d at a surface 128, and the bar 130 is located past the surface 128 relative to the battery cells 60d.

A fixed anchor 138 holds a portion of the strap 76d. An attachment of the strap 76d to a brace 140, separate from the heat exchange structure 64d, provides the fixed anchor 138. A tray structure can include the brace 140, for example.

A fixed anchor 142 holds another portion of the strap 76d. An attachment of the strap 76d to a brace 144 separate from the heat exchange structure 64d provides the fixed anchor 142.

The strap 76d is looped about a brace 146 to provide an unfixed anchor 148, which redirects the strap 76d before connecting to the fixed anchor 142. A tray structure could provide the brace 140, the brace 144, the brace 146, or any combination thereof.

In this example, all portions of the strap 76d are spaced from the heat exchange structure 64d, such that no portion of the strap 76d contacts the heat exchange structure 64d.

A strap could be used with any combination of the fixed anchors and unfixed anchors pull together a heat exchange structure and a plurality of battery cells. The strap could completely circumferentially surround the cells, as shown in the example of FIGS. 2 and 3. The strap could partially circumferentially surround the cells, as shown in the examples of FIGS. 4 to 8.

A feature of some of the examples described above is the elimination or reduction in threaded fasteners, toe clips, etc. required to secure battery arrays. In some examples, this can reduce a required packaging footprint.

For example, referring again to FIG. 7, the array 18c can be positioned closer to the array 18c' because of the anchor bar 124. If a mechanical fastener were used instead of the anchor bar 124, access for a torque tool would be required.

Another feature is that the strap limits lateral motion of the battery array or arrays, as well as up and down motion. The array can move together as a single unit during an inertial load, which can, among other things, resist deformation.

In another example, the anchor between the arrays can be eliminated and the strap could serve not only to pull the plurality of cells toward a heat exchanger but also to pull one array toward the adjacent array. This could further limit lateral motion and reduce packaging footprint by reducing space between arrays and adding system stiffness with array-to-array contact.

In this disclosure, like reference numerals designate like elements where appropriate. Reference numerals with the addition of letter designate modified elements. The modified elements incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A retention assembly, comprising:
a plurality of battery cells;
a heat exchange structure having a first side and an opposite, second side, the plurality of battery cells interfacing with the first side of the heat exchange structure, the heat exchange structure configured to communicate a liquid coolant;
a strap that pulls together the heat exchange structure and the plurality of battery cells, wherein the plurality of battery cells are disposed along an axis, wherein the strap extends from a first position adjacent a first lateral side of the plurality of battery cells, to a second position adjacent an opposite, second lateral side of the plurality of battery cells; and
an anchor to hold the strap.

2. The retention assembly of claim 1, wherein the heat exchange structure comprises the anchor.

3. The retention assembly of claim 1, wherein the anchor is a fixed anchor such that the strap is directly secured.

4. The retention assembly of claim 1, wherein the anchor interfaces with the second side such that the heat exchange structure is sandwiched between the anchor and the plurality of battery cells, wherein the strap extends past the first side to the anchor such that the strap extends from the first side of the heat exchange structure to the second side of the heat exchange structure.

5. The retention assembly of claim 1, wherein the plurality of battery cells is a first plurality of battery cells along a first axis, and further comprising a second plurality of battery cells along a second axis, the first axis laterally spaced a distance from the second axis, wherein the strap includes a first portion pulling together the first plurality of battery cells and the heat exchange structure, and a second portion pulling together the second plurality of battery cells and the heat exchange structure.

6. The retention assembly of claim 5, wherein the anchor is positioned between the first plurality of battery cells and the second plurality of battery cells.

7. The retention assembly of claim 1, wherein the plurality of battery cells form a portion of a traction battery of an electrified vehicle.

8. A retention assembly, comprising:
a plurality of battery cells;
a heat exchange structure having a first side and an opposite, second side, the plurality of battery cells interfacing with the first side of the heat exchange structure, the heat exchange structure configured to communicate a liquid coolant; and
a strap that pulls together the heat exchange structure and the plurality of battery cells, wherein the plurality of battery cells are disposed along an axis, and further comprising
a first sidewall disposed along a first laterally facing side of the plurality of battery cells, and a second sidewall disposed along a second laterally facing side of the battery cells, the first laterally facing side opposite the second laterally facing side, wherein the strap directly contacts the sidewalls.

9. The retention assembly of claim 8, wherein the strap is spaced from the plurality of battery cells such that no portion of the strap contacts the plurality of battery cells.

10. The retention assembly of claim 1, further comprising at least one brace, the strap compressing the at least one brace against the second side of the heat exchange structure opposite the plurality of battery cells.

11. The retention assembly of claim 1, further comprising a tensioning device, wherein the strap has a tension and the tensioning device is configured to adjust the tension.

12. The retention assembly of claim 1, wherein the heat exchange structure provides a liquid-coolant path.

13. The retention assembly of claim 1, wherein a first fixed anchor attaches the strap to the heat exchange structure on a first lateral side of the plurality of battery cells, and a second fixed anchor attaches the strap to the heat exchange structure on an opposing, second lateral side of the plurality of battery cells, the first and second lateral sides each facing in a direction transverse to the axis.

14. The retention assembly of claim 13, wherein the first and second fixed anchors directly attach the strap to the heat exchange structure.

15. The retention assembly of claim 13, wherein the first and second fixed anchors are mechanical fasteners that directly attach the strap to the heat exchange structure.

16. The retention assembly of claim 1, wherein each of the plurality of battery cells are disposed along an axis, the strap extending circumferentially about the plurality of battery cells to completely circumferentially surround the plurality of battery cells.

17. The retention assembly of claim 7, wherein the battery cells of the traction battery are configured to provide propulsive power that is used to drive wheels of the electrified vehicle.

18. A retention assembly, comprising:
a plurality of traction battery cells disposed along an axis;
a first array plate positioned adjacent a first lateral side of the plurality of traction battery cells;
a second array plate positioned adjacent an opposite, second lateral side of the plurality of traction battery cells;
a strap having a portion spanning over the plurality of traction battery cells from the first to the second array plate, the portion spaced from all portions of the plurality of traction battery cells to provide an open area, the open area between the portion and the plurality of traction battery cells, the open area extending from the first to the second array plate; and
a heat exchange structure pulled relatively toward the plurality of traction battery cells by the strap, the heat exchange structure configured to communicate a liquid coolant.

19. The retention assembly of claim 8, wherein the strap pulls together the heat exchange structure and the plurality of battery cells without pulling any structure that is axially between the plurality of battery cells.

* * * * *